(12) United States Patent
Mukaide et al.

(10) Patent No.: US 9,298,214 B2
(45) Date of Patent: Mar. 29, 2016

(54) DISPLAY APPARATUS

(71) Applicant: SANYO ELECTRIC CO., LTD., Moriguchi-shi, Osaka (JP)

(72) Inventors: Masayoshi Mukaide, Moriguchi (JP); Atsushi Mizutani, Moriguchi (JP); Mitsutaka Murakoshi, Moriguchi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/222,044

(22) Filed: Mar. 21, 2014

(65) Prior Publication Data

US 2014/0204564 A1 Jul. 24, 2014

Related U.S. Application Data

(63) Continuation of application No. PCT/JP2012/074466, filed on Sep. 25, 2012.

(30) Foreign Application Priority Data

Sep. 30, 2011 (JP) .................................. 2011-216251
Oct. 28, 2011 (JP) .................................. 2011-236956

(51) Int. Cl.
*G09F 13/04* (2006.01)
*G06F 1/16* (2006.01)
*H04N 5/64* (2006.01)
*H04N 5/66* (2006.01)

(52) U.S. Cl.
CPC ................ *G06F 1/1601* (2013.01); *H04N 5/64* (2013.01); *H04N 5/66* (2013.01)

(58) Field of Classification Search
CPC ............... G02F 2210/133612; G02F 1/133608
USPC ......................................................... 362/97.1
See application file for complete search history.

(56) References Cited

U.S. PATENT DOCUMENTS

| 6,198,510 | B1 | 3/2001 | Suzukawa et al. | |
| 7,992,184 | B2 * | 8/2011 | Doumuki ...................... | 725/141 |
| 2003/0233667 | A1 * | 12/2003 | Umipig et al. ................ | 725/152 |
| 2004/0177199 | A1 * | 9/2004 | Yang ............................. | 710/301 |

(Continued)

FOREIGN PATENT DOCUMENTS

| JP | H0-136275 | 5/1998 |
| JP | 2002-222052 | 8/2002 |

(Continued)

*Primary Examiner* — Robert May
*Assistant Examiner* — Bryon T Gyllstrom
(74) *Attorney, Agent, or Firm* — Hamre, Schumann, Mueller & Larson, P.C.

(57) ABSTRACT

A display apparatus includes a display panel, a backlight, a pair of inverter circuit boards that are respectively arranged in vicinities of end portions in a longitudinal direction of a back side of the display panel, and an expansion slot unit having an expansion slot, a case that includes a slit serving as an opening through which a expansion board to be inserted into the expansion slot is inserted and can guide and house the expansion hoard, and an expansion slot board, the expansion slot unit being arranged on the back side of the display panel to be adjacent to a side of one of the pair of the inverter circuit boards and the slit being provided in an open state at a position separated from the side edge of the display panel by more than a length in an insertion direction of the expansion board that is inserted.

1 Claim, 5 Drawing Sheets

(56) References Cited

U.S. PATENT DOCUMENTS

| | | | |
|---|---|---|---|
| 2006/0181867 A1* | 8/2006 | Choi et al. | 362/97 |
| 2007/0165424 A1* | 7/2007 | Sakai | 362/633 |
| 2009/0027875 A1* | 1/2009 | Terada et al. | 362/97.2 |
| 2009/0073675 A1* | 3/2009 | Takata | 362/97.1 |
| 2009/0103281 A1* | 4/2009 | Koh | 362/97.1 |
| 2009/0135584 A1* | 5/2009 | Lin | 362/97.1 |
| 2010/0061086 A1* | 3/2010 | Park et al. | 362/97.2 |
| 2010/0195312 A1* | 8/2010 | Ko et al. | 362/97.1 |
| 2012/0002117 A1* | 1/2012 | Matsumoto | 348/739 |

FOREIGN PATENT DOCUMENTS

| | | |
|---|---|---|
| JP | 3098215 U | 2/2004 |
| JP | 2005-37630 | 2/2005 |
| JP | 2007-108250 | 4/2007 |
| JP | 2010-258910 | 11/2010 |

* cited by examiner

F I G. 1
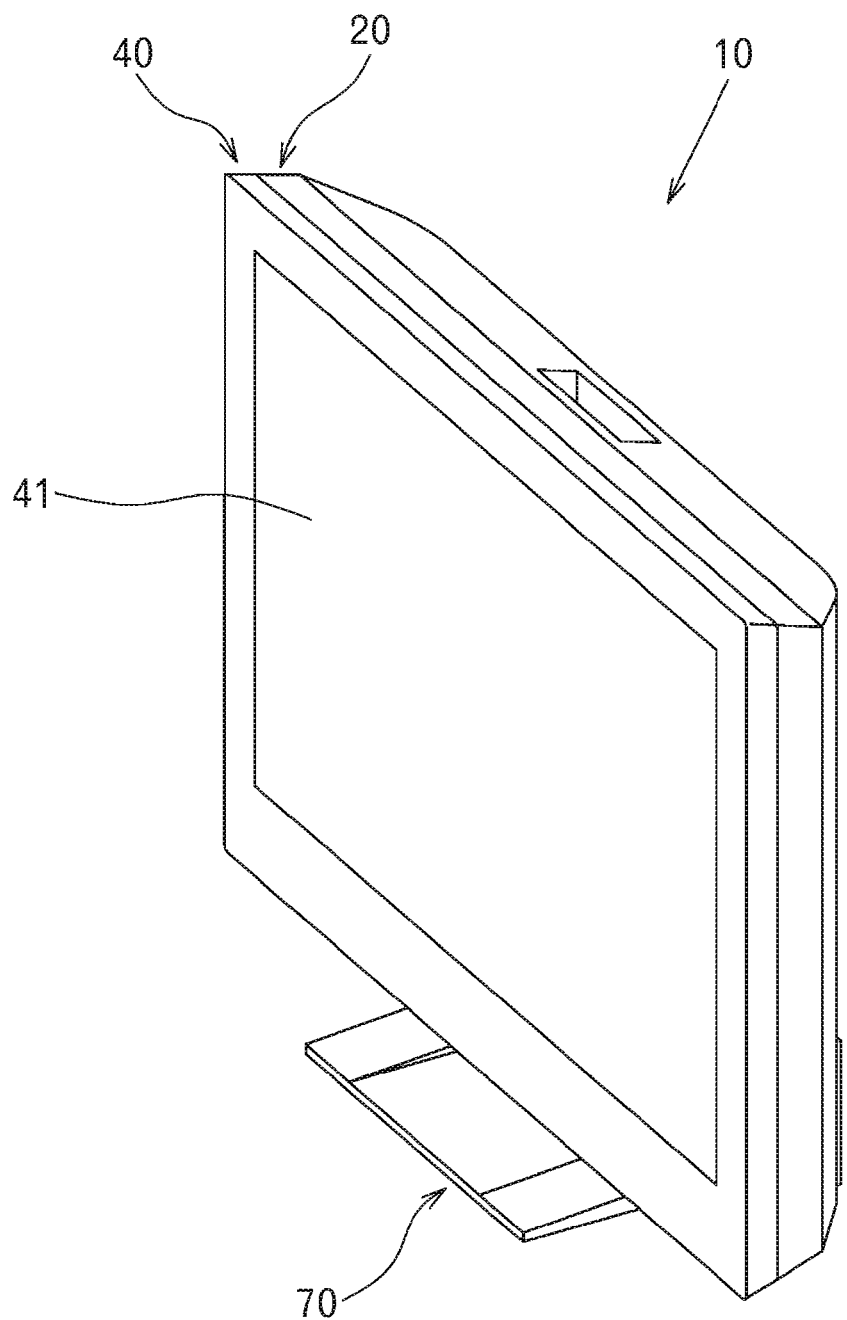

F I G. 2
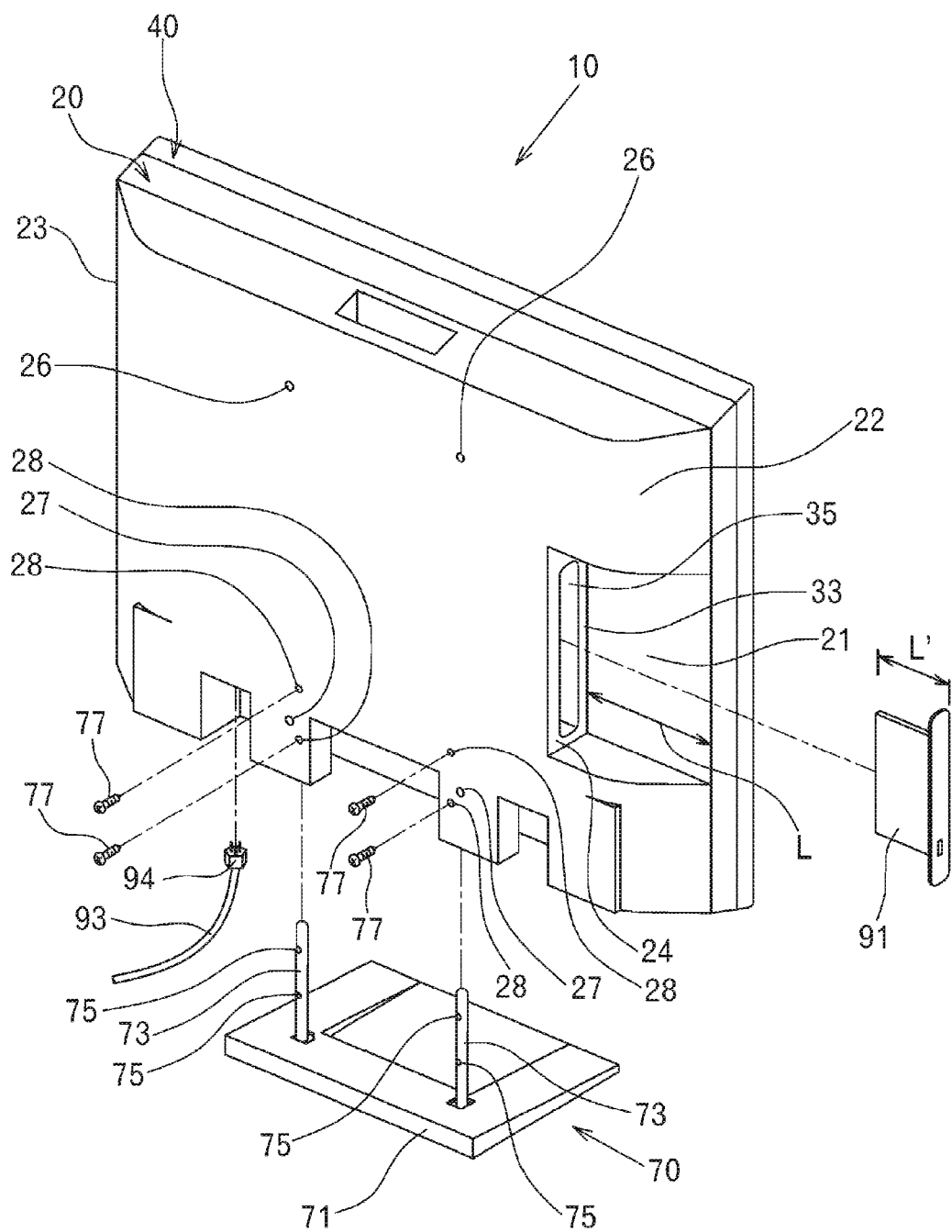

DISPLAY APPARATUS

TECHNICAL FIELD

The present invention relates to a display apparatus incorporating an expansion slot unit, and more specifically, to a display apparatus in which an expansion slot unit is arranged so as to be displaced from an inverter circuit board connected to a backlight.

BACKGROUND ART

A device that not only merely receives broadcasts but can be connected to a network such as the Internet and used to browse Web sites has been proposed as a display apparatus such as a digital liquid crystal television receiver (see JP HEI10-136275A for example).

Also, a so-called multi-display system has been proposed in which a plurality of display apparatuses are vertically and horizontally arranged and each display apparatus can display video or the like of an area corresponding to the position where the display apparatus is arranged (see JP 2005-37630A for example).

However, for example, Web sites cannot be browsed using only a display apparatus with no function of receiving the Internet, and therefore, another external device such as a personal computer (PC) connected to the Internet is required to be separately connected through a cable. Also, when implementing the multi-display system, an external device such as a PC is required to be connected in order to input control signals or image signals to the display apparatus.

It is conceivable to install more terminals in the housing of the display apparatus in order to support to an Internet connection or input of control signals from an external device, but there are also calls not to install too many terminals in the housing, in a case of the display apparatus for business use, for example.

Therefore, the inventors of the present invention have proposed that a display apparatus incorporate an expansion slot unit with an expansion slot into which an expansion board can be inserted, for example, in order to directly insert a PC board so as to use content for PC only with the display apparatus.

However, generally, various electronic components such as a power source board connected to a terminal for the connection to a power source, a pair of left and right inverter circuit boards connected to a backlight of a display panel, a main board connected to a terminal group including an external input and the like are housed inside a display apparatus. Accordingly, there are cases where sufficient space for further incorporating an expansion slot unit cannot be secured depending on the size of the display apparatus.

In particular, the inverter circuit board generates much heat during operation, and, therefore, it is thought that when the expansion slot unit is arranged to overlap the inverter circuit board, the heat affects the expansion slot unit and the expansion board inserted thereinto.

Also, the power source board generates heat, and, therefore, the expansion slot unit cannot be arranged to overlap the power source board. In addition, it must be taken into consideration, when implementing a multi-display system, that display apparatuses are installed in a vertical attitude in which the longitudinal direction is vertical as well as in a horizontal attitude in which the longitudinal direction is horizontal, such that the display apparatuses display image surfaces in a vertical direction as well as in a horizontal direction depending on the arrangement or the like.

SUMMARY OF THE INVENTION

The display apparatus according to the present invention is a display apparatus including a display panel, a backlight serving as a light source of the display panel, a pair of inverter circuit boards that are respectively arranged in vicinities of end portions in a longitudinal direction of a back side of the display panel and supply power to the backlight, and an expansion slot unit having an expansion slot into which an expansion board can be inserted, a case that includes a slit serving as an opening through which the expansion board to be inserted into the expansion slot is inserted and can guide and house the expansion board, and an expansion slot board that is connected to the expansion slot, the expansion slot unit being arranged on the back side of the display panel to be adjacent to a side of one of the pair of the inverter circuit boards and the slit being provided in an open state at a position separated from the side edge of the display panel by more than a length in an insertion direction of the expansion board that is inserted.

BRIEF DESCRIPTION OF DRAWINGS

FIG. 1 is a perspective view of a display apparatus, which is an embodiment of the present invention, as viewed from a diagonal front side.

FIG. 2 is a perspective view of the display apparatus, which is an embodiment of the present invention, as viewed from a back side.

DESCRIPTION OF EMBODIMENTS

Figure 3:
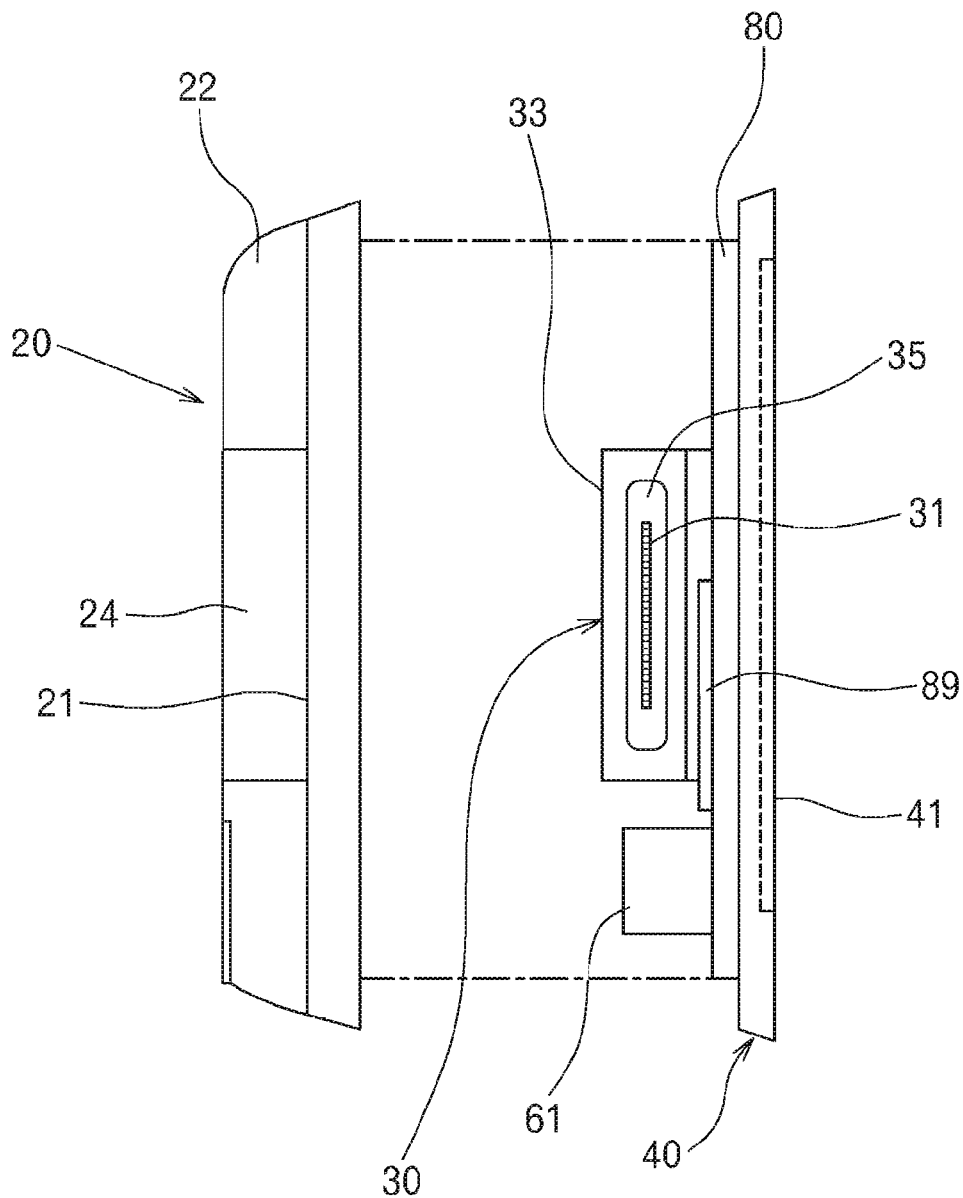
FIG. 3 is a left side view of the display apparatus in which a cover is removed.

Hereinafter, an embodiment in which a display apparatus 10 of the present invention is applied to a digital liquid crystal television receiver is specifically described, with reference to the drawings. In the description below, a direction in which a display panel 41 faces the viewer is the "front", and the opposite direction is the "back". A vertical direction refers to the vertical direction in a horizontal attitude in which the longitudinal direction of the display panel 41 is horizontal, unless otherwise stated. Moreover, in terms of a horizontal direction, "right" and "left" are defined as viewed from the back side of the display apparatus 10. It should be noted that, in a vertical attitude in which the longitudinal direction of the display panel 41 is vertical, the display apparatus 10 is arranged such that the right side is located in the upper position when the display apparatus 10 is viewed from the back side.

The present invention relates to the display apparatus 10 incorporating an expansion slot unit 30 into which an expansion board 91 can be directly inserted. Here, the expansion board 91 includes a circuit board containing a chip for adding a different function or an expansion function to the functions of the display apparatus 10 and other electronic components, and the like, and specifically, examples thereof include a PC board, a video board, a LAN (local area network) board, a specific board such as a control board, and an interface board containing a USB terminal, an HDMI terminal and a video input/output terminal. Of course, the expansion board 91 is not limited to these examples.

It is possible to use content for PC only with the display apparatus 10 of the present invention by inserting a PC board into the expansion slot unit 30 as the expansion board 91, and to implement a multi-display system without connecting a PC or the like thereto through a cable. Moreover, it is possible to connect the display apparatus 10 to a network such as the Internet and transmit information to the Internet, a server, a PC, a cellular phone, and the like only with the display apparatus 10 by inserting a LAN board into the expansion slot unit 30 as the expansion board 91.

As shown in FIG. 1, the display apparatus 10 is obtained by arranging the display panel 41, which is a liquid crystal panel capable of displaying video or images, such that its longitudinal direction is horizontal. In the display apparatus 10, an outer circumference of the front surface and side circumferential surface of the display panel 41 are surrounded by a front frame 40 and the hack side of the display panel 41 is covered with a cover 20 shown in FIG. 2 and FIG. 3, so as to reach the front frame 40.

As shown in FIG. 3, a metal attaching plate 80 is attached to the back surface of the display panel 41 by screws or the like, and various electronic components are mounted on the attaching plate 80.

More specifically, as shown in FIG. 3 to FIG. 6, the attaching plate 80 includes the expansion slot unit 30 with an expansion slot board 37 on which an expansion slot 31 is mounted, a first main board 83 and a second main board 85 for performing various controls of the display apparatus 10, a terminal group 65 for an external input/output for the main boards 83 and 85, a power source board 81, a power source connection terminal 64 for connecting an external commercial power source to the power source board 81, a pair of left and right inverter circuit boards 89 for a backlight (not shown) of the display panel 41, speakers 61, a wall-hanging upper frame 51 for attaching the display apparatus 10 to a wall or the like, a lower frame 53 for a stand for installing the display apparatus 10 on a mount, the floor or the like.

Figure 4:
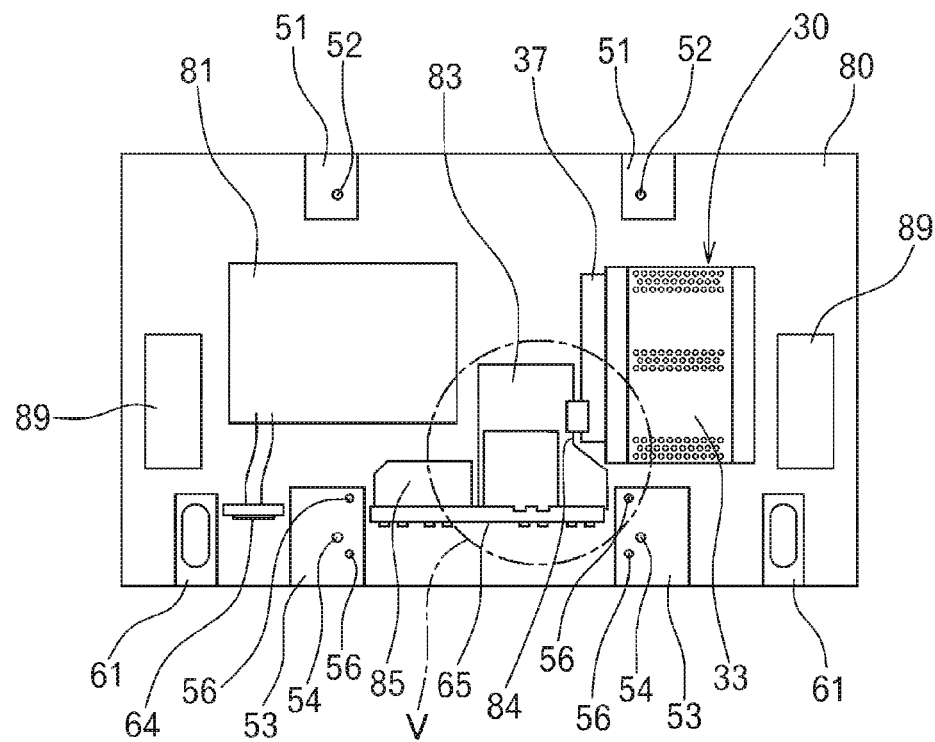
FIG. 4 is a back view of the display apparatus in which the cover and a front frame are removed.
Figure 5:
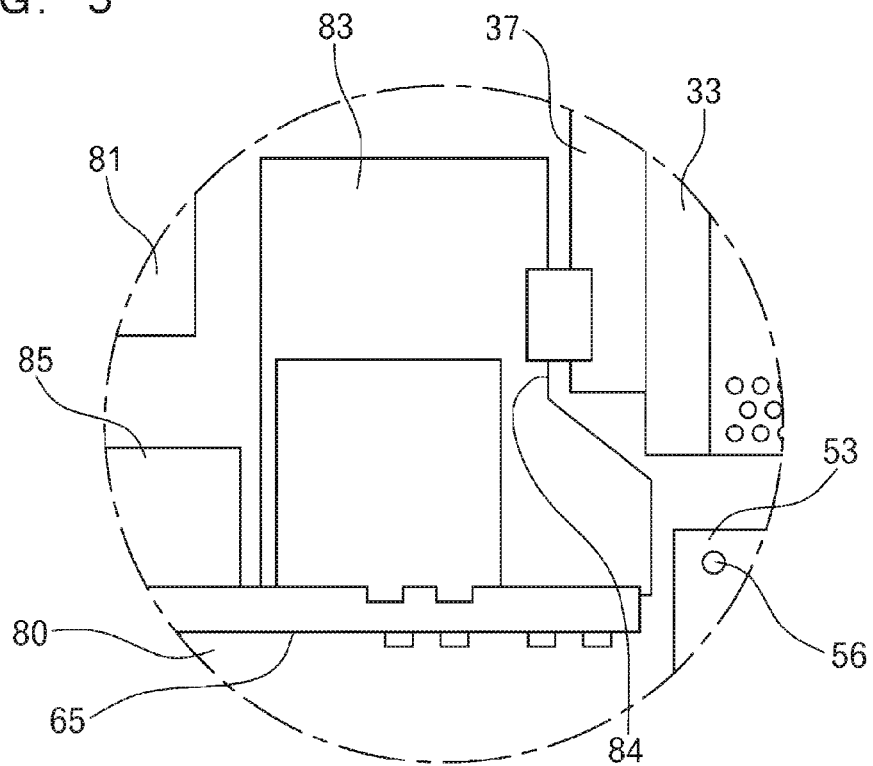
FIG. 5 is an enlarged view of the circle portion V in FIG. 4.
Figure 6:
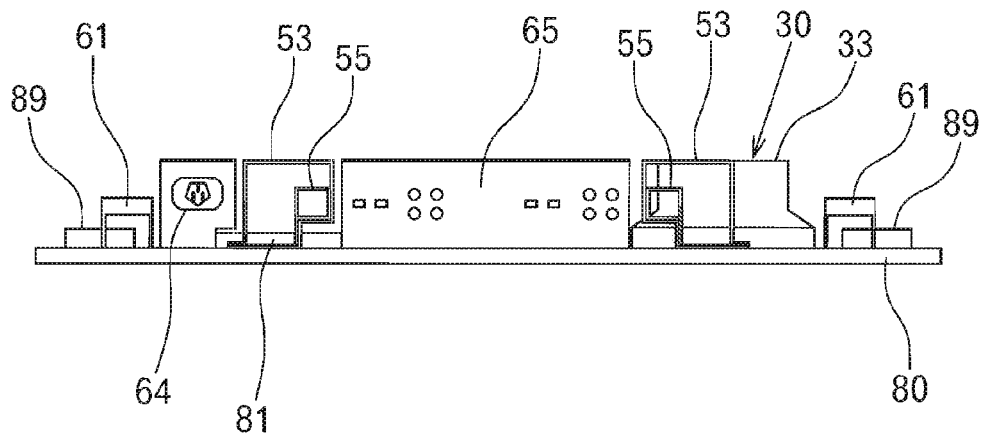
FIG. 6 is a bottom view of the display apparatus in which the cover and the front frame are removed.

The main boards 83 and 85, which are boards for performing various controls of the display apparatus 10 such as processing of video that the display panel 41 displays and processing of a sound, are arranged substantially in the center of the attaching plate 80. The terminal group 65 obtained by collecting terminals in one part is connected to the main boards 83 and 85 such that a plurality of wirings for delivering signals to/from external electronic devices and the like can be connected to the terminal group from the same direction. In the present embodiment, as shown in FIG. 4 to FIG. 6, the terminal group 65 is arranged substantially in the center of the attaching plate 80 below the main boards 83 and 85 such that connectors face downward.

The power source board 81, which is a board for supplying power to the display apparatus 10, is electrically connected to the power source connection terminal 64, and a power source connector 94 (see FIG. 2) of a power source cable 93 that is an external wiring is connected to the power source connection terminal 64. It is preferable to shorten a distance between the power source board 81 and the power source connection terminal 64 in order to shorten the wiring in the display apparatus 10.

The stability of the display apparatus 10 as installed can be enhanced by connecting the power source cable 93 to the power source connection terminal 64 at the position below the center of gravity of the display apparatus 10. On the other hand, the display apparatus 10 may be used in a vertical attitude in which the longitudinal direction of the display panel 41 is vertical. Also, in this case, it is required to connect the power source cable 93 at the position below the center of gravity of the display apparatus 10 in order to enhance the stability of the display apparatus 10 as installed.

Therefore, the power source board 81 is arranged so as to be positioned on the lower side when the display apparatus 10 is vertically installed; that is, in the present embodiment, the power source board 81 is arranged so as to be positioned on the left side as viewed from the back side of the attaching plate 80.

The inverter circuit boards 89 are arranged at the left and right portions of the attaching plate 80, and supply AC power to the backlight. The inverter circuit boards 89 are arranged in the vicinities of the left and right ends of the attaching plate 80.

Moreover, the speakers 61 are arranged below the inverter circuit boards 89, respectively.

The expansion slot unit 30 incorporated in the display apparatus 10 of the present embodiment includes the expansion slot 31 serving as a connector to which the expansion board 91 is electrically connected, a case 33 guiding and housing the expansion board 91, and the expansion slot board 37 connected to the expansion slot 31. The expansion slot board 37 is attached to the attaching plate 80. In the case 33, a slit 35 through which the expansion board 91 is loaded and unloaded is provided in an open manner at the position facing the expansion slot 31.

The above-described expansion slot unit 30 is arranged on the back side of the display panel 41 to be adjacent to one of the pair of the inverter circuit boards 89. More specifically, for the following reasons, the above-described expansion slot unit 30 can be arranged between the main boards 83 and 85 and the inverter circuit board 89 on the opposite side to the power source hoard 81 in between the main boards 83 and 85.

The expansion slot unit 30 is arranged such that the slit 35 is open toward the side of the display apparatus 10. By this arrangement, the expansion board 91 can be inserted through the slit 35 from the side when the display apparatus 10 is horizontally installed, or from the top when the display apparatus 10 is vertically installed.

It should be noted that there are cases where a plurality of the display apparatuses 10 are arranged vertically and horizontally to be used as one screen in order to implement a multi-display by, for example, a daisy chain connection. At this time, the slit 35 of the expansion slot unit 30 that is open toward the side of the display apparatus 10 faces the adjacent cover 20 of the display apparatus 10 juxtaposed to the slit 35. Therefore, if a distance between the slit 35 and the adjacent cover 20 of the display apparatus 10 is short, there is a possibility of not being able to load or unload the expansion board 91 through the slit 35.

Therefore, the expansion slot unit 30 is arranged on one end side in a longitudinal direction of the display apparatus 10, that is, in the drawing, on the right side as viewed from back side such that a distance L from the position of the opening of the slit 35 to the side edge of the cover 20 is longer than the length L' of the expansion board 91 in an insertion direction.

By arranging the expansion slot unit 30 in this manner, even if, for example, a plurality of the display apparatuses 10 are arranged vertically and horizontally in order to implement a multi-display system, a space L larger than the length L' of the insertion of the expansion board 91 is secured in an opening direction of the slit 35. Accordingly, the expansion board 91 can be loaded and unloaded through the slit 35 in a lateral direction on the back side of the display apparatus 10 without changing the arrangement of the display apparatuses 10 that are juxtaposed adjacent to each other even in a state where the multi-display system is formed. The same action and effect are exhibited even when the display apparatus 10 is arranged such that the slit 35 is in contact with a wall surface or the like in an opening direction.

On the other hand, with the above-described arrangement, there is a possibility of the expansion slot unit 30 overlapping the above-described main boards 83 and 85 that are located substantially in the center of the attaching plate 80. Therefore, the expansion slot unit 30 is arranged as shown in FIG. 4 so as to avoid the main boards 83 and 85 and be displaced in a longitudinal direction of the display apparatus 10. In FIG. 4, the expansion slot unit 30 is arranged so as to be displaced to the right side with respect to the main boards 83 and 85 as viewed from the back side.

However, even if the expansion slot unit 30 is arranged so as to be displaced to one end side in a longitudinal direction of the display apparatus 10, there is a possibility that the first main board 83 extending in a vertical direction of the display apparatus 10 and the expansion slot board 37 of the expansion slot unit 30 extending in a longitudinal direction overlap. Therefore, in the present embodiment, as shown in FIG. 5, a cutaway portion 84 that is cut away such that the width in a longitudinal direction becomes narrow corresponding to the shape of the expansion slot board 37 is formed in the upper portion in a vertical direction of the first main board 83 in order to avoid overlapping the expansion slot board 37. By forming the cutaway portion 84 in the first main board 83, the expansion slot board 37 does not overlap the wide first main board 83, so that the expansion slot unit 30 can be juxtaposed to the first main board 83 on the attaching plate 80.

Furthermore, in consideration of the influence of heat from the power source board 81, which reaches a high temperature, the expansion slot unit 30 is arranged in a position spaced from the power source board 81, that is, in the opposite position across the main boards 83 and 85. Heat generated by the power source board 81, which is located at the lower portion when the display apparatus 10 is vertically installed, is diffused toward a large space inside the cover 20 of the display apparatus 10 in the upper direction. Accordingly, the heat does not stay in the vicinity of the power source board 81. Therefore, it is possible to prevent the heat from affecting not only the power source board 81 but also the peripheral main boards 83 and 85, and the expansion slot unit 30.

The inverter circuit board 89 also generates heat during use. Therefore, if the expansion slot unit 30 is arranged so as to overlap the inverter circuit board 89, there is a possibility of the expansion slot unit 30 being damaged by the heat.

However, in the present invention, the expansion slot unit 30 is arranged between the main boards 83 and 85 and the inverter circuit board 89, and therefore, it is possible to prevent the expansion slot unit 30 from overlapping or being arranged near the inverter circuit board 89. Accordingly, the expansion slot unit 30 is not easily affected by heat from the inverter circuit board 89. Therefore, it is possible to avoid or reduce malfunction of the expansion slot unit or the expansion board inserted into the expansion slot unit caused by being affected or damaged by heat.

Conventionally, although no hoard, device, or the like is particularly arranged in such a space, such a region is effectively used to arrange the expansion slot unit 30, so that it is possible to extend or diversify the functions of the display apparatus 10 or enhance the performance thereof without enlarging the display apparatus 10.

A stand 70 for enabling the display apparatus 10 to stand on a mount or the floor on its own is removably attached to the lower end of the display apparatus 10 in a state where the display apparatus 10 is horizontally installed.

As shown in FIG. 2, the stand 70 includes a base 71 and two columns 73 arranged vertically on the base 71. The column 73 is provided with screw holes 75 into which fixing screws 77 for fixing the column 73 to the display apparatus 10 are screwed.

As shown in FIG. 4 and FIG. 6, in the display apparatus 10, a pair of lower frames 53 for a stand for supporting the stand 70 are arranged at the lower end of the attaching plate 80 with a predetermined space. More specifically, the lower frame 53 for a stand is formed by bending a metal plate, and, as shown in FIG. 7, a cylindrical stand holder 55 that is open downward and fixes the column 73 is attached to the inside of the lower frame 53 for a stand.

The lower frame 53 for a stand is provided with loose holes 56 through which stand fixing screws 77 are passed at positions facing screw holes 75 of the column 73. Moreover, cylindrical guide holes 57 through which the fixing screws 77 for fixing the column 73 are passed are provided on the stand holder 55 between the stand holder 55 and the lower frame 53 for a stand.

The stand 70 can be undetachably fixed to the display apparatus 10 by inserting the columns 73 into the stand holders 55 from the lower side of the display apparatus 10 and screwing the fixing screws 77 into the screw holes 75 of the columns 73. Thereby, the display apparatus 10 can be installed on the stand 70 in a horizontal attitude.

Figure 7:
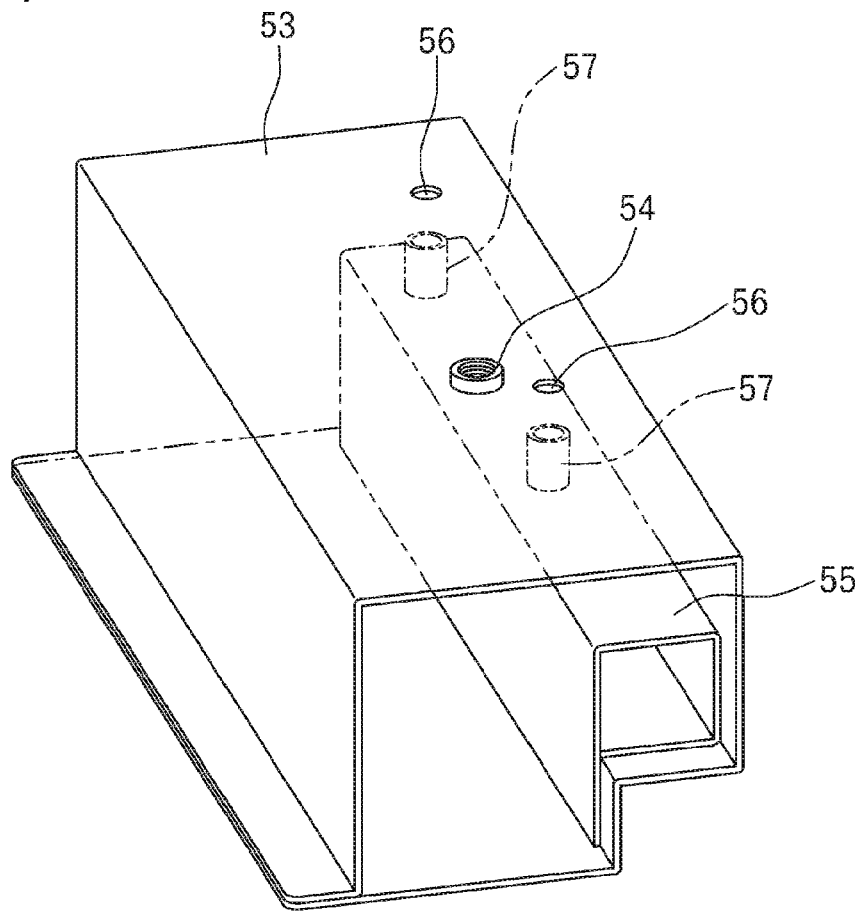
FIG. 7 is a perspective view of a lower frame for a stand included in the display apparatus.

Furthermore, as shown in FIG. 4 and FIG. 7, the lower frame 53 for a stand is provided with a wall-hanging lower boss 54 for fixing, by a screw or the like, wall-hanging hardware not shown for hanging the display apparatus 10 on a wall surface or the like. Moreover, as shown in FIG. 4, on the upper end side of the attaching plate 80, wall-hanging upper frames 51 project at the opposing position of the lower frame 53 for a stand. The wall-hanging frames 51 can be formed by bending a metal plate and are provided with a wall-hanging upper boss 52 for fixing the wall-hanging hardware by a screw or the like.

The lower frames 53 for a stand and the wall-hanging upper frames 51 are arranged so as to form a rectangle, desirably a square, with the wall-hanging lower bosses 54 and the wall-hanging upper bosses 52 as apexes.

The display apparatus 10 can be hung on a wall by fixing the wall-hanging hardware to the above-described wall-hanging lower bosses 54 and the wall-hanging upper bosses 52 by screws.

With the present embodiment, since the lower frame 53 for a stand is not only used to attach the column 73 of the stand 70 but also serves as a frame for attaching the wall-hanging hardware, components for installing the display apparatus 10 and components for hanging the display apparatus 10 on a wall need not be prepared separately, and therefore, the number of the components can be reduced.

Moreover, since the lower frame 53 for a stand and the wall-hanging upper frame 51 are directly attached to the attaching plate 80 and have sufficient strength, there is the advantage that other reinforcing members can be omitted when the display apparatus 10 is installed or hung on a wall.

The back surface of the display panel 41 is covered with the cover 20 in a state where the various components and the like are mounted on the attaching plate 80 attached to the back surface of the display panel 41. As shown in FIG. 2 and FIG. 3, the cover 20 has bending portions 22 and 23 in which the left and right sides of the cover 20 are bent toward the front frame 40, and has a recessed portion 21 that is recessed toward the front surface side in a region from the position facing the above-described slit 35 of the expansion slot unit 30 to the side edge of the cover 20 in one of the bending portions, that is, in the present embodiment, in the right bending portion 22 as viewed from the back side. An insertion opening 24 is open at the position where the recessed portion 21 faces the slit 35 in order to expose the slit 35.

As described above, in the expansion slot unit 30, the slit 35 is arranged at a position separated by more than the length L' in an insertion direction of the expansion board 91 from the side edge of the display apparatus 10 and therefore, the distance L from the side edge of the display apparatus 10 to the insertion opening 24 is also longer than L'.

Therefore, even if, for example, a plurality of the display apparatuses 10 are arranged vertically and horizontally in order to form a multi-display system, a space larger than the length L' in an insertion direction of the expansion board 91 is secured in the cover 20 by the recessed portion 21. Accordingly, the expansion board 91 can be loaded and unloaded through the recessed portion 21 in a lateral direction on the back side of the display apparatus 10 without changing the arrangement of the display apparatuses 10 that are juxtaposed adjacent to each other.

It should be noted that the lower end of the cover 20 has a shape corresponding to the shapes of the pair of the speakers 61 and the lower frames 53 for a stand, and an opening for exposing the power source connection terminal 64, the terminal group 65, and the stand holder 55 is provided at the lower end of the cover 20. Moreover, fixing screw through-holes 28 through which the above-described fixing screws 77 are passed are formed at the positions facing the loose holes 56 of the lower frames 53 for a stand, and wall-hanging hardware through-holes 26 and 27 through which the wall-hanging hardware is passed are formed at the positions facing the wall-hanging lower bosses 54 and the wall-hanging upper bosses 52.

Thus, with the display apparatus 10 of the present invention, the expansion board 91 adaptable to various functions can be directly inserted to the display apparatus 10 and therefore, various functions that the display apparatus 10 does not have originally can be added thereto.

Moreover, the pair of the lower frames 53 for a stand are arranged in the lower portion of the attaching plate 80, and enable the display apparatus 10 to be installed in a horizontal attitude by the stand 70. Furthermore, the lower frame 53 for a stand also serves as the wall-hanging lower boss 54 enabling the display apparatus 10 to be hung on a wall, and the wall-hanging upper boss 52 of the wall-hanging upper frame 51 can be used to hang the display apparatus 10 on a wall without using other reinforcing members.

It will be appreciated that the constituent elements of the present invention are not limited to those in the above-described embodiment, and various modifications can be made without departing from the technical scope described in the claims. For example, the display apparatus of the present invention incorporates the expansion slot unit 30, but is not limited thereto, and an electronic device such as a DVD player can be incorporated. Moreover, many types of display apparatus for digital signage do not originally come with a TV tuner. However, there are also calls to be able to watch TV broadcasts on a signage monitor arranged in a public place. To achieve this, a configuration may be adopted to enable a TV tuner board instead of or in addition to a PC board to be inserted into the expansion slot unit.

INDUSTRIAL APPLICABILITY

The present invention is useful as a display apparatus that can reduce an influence of heat generated by an inverter circuit board on an expansion slot unit.

LIST OF REFERENCE NUMERALS

10 Display apparatus
20 Cover
21 Recessed portion
24 Insertion opening
30 Expansion slot unit
41 Display panel
51 Wall-hanging upper frame
53 Lower frame for a stand
55 Stand holder
70 Stand
80 Attaching plate
81 Power source board
83 First main board
84 Cutaway portion
85 Second main board

The invention claimed is:
1. A display apparatus comprising:
a display panel;
a backlight serving as a light source of the display panel;
a pair of inverter circuit hoards that are respectively arranged in vicinities of end portions in a longitudinal direction of a back side of the display panel and supply power to the backlight;
an expansion slot unit having an expansion slot into which an expansion board can be inserted, a case that includes a slit serving as an opening through which the expansion board to be inserted into the expansion slot is inserted and can guide and house the expansion board, and an expansion slot board which is connected to the expansion slot; and
a main board connected to a terminal group capable of wired communication with external devices on the back side of the display panel,
wherein the expansion slot unit is arranged on the back side of the display panel to be adjacent to a side of one of the pair of the inverter circuit boards,
the slit is provided in an open state at a position separated from the side edge of the display panel by more than a length in an insertion direction of the expansion hoard that is inserted, and
the main board includes a cutaway portion that is cut away in a shape corresponding to the shape of the expansion slot unit.

* * * * *